J. T. CRAMER & F. S. LANGLEY.
LOCK OR SAFETY NUT.
APPLICATION FILED JULY 10, 1908.
915,559.
Patented Mar. 16, 1909.
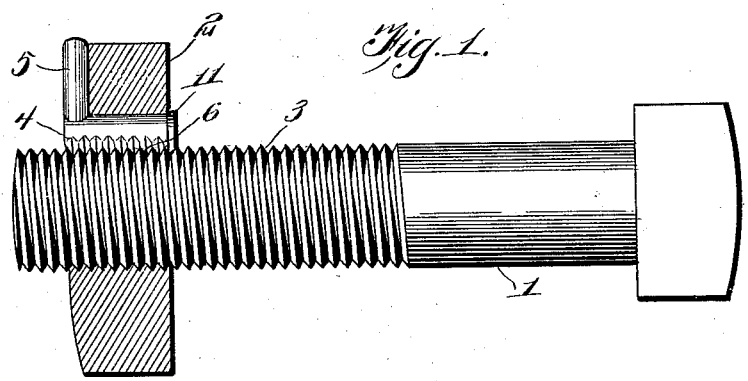
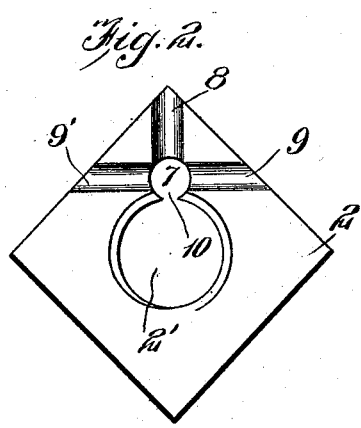
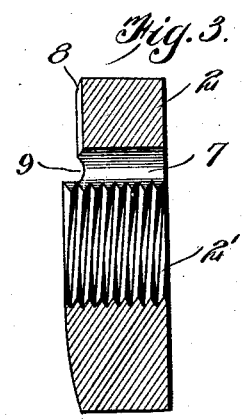
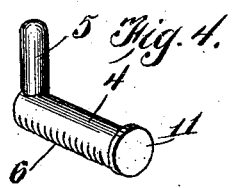
Witnesses
Inventors
John T. Cramer
Fred S. Langley
By Victor J. Evans
Attorney

UNITED STATES PATENT OFFICE.

JOHN T. CRAMER AND FRED S. LANGLEY, OF CABINET, IDAHO.

LOCK OR SAFETY NUT.

No. 915,559.　　　Specification of Letters Patent.　　　Patented March 16, 1909.

Application filed July 10, 1908. Serial No. 442,905.

*To all whom it may concern:*

Be it known that we, JOHN T. CRAMER and FRED S. LANGLEY, citizens of the United States, residing at Cabinet, in the county of Bonner and State of Idaho, have invented new and useful Improvements in Lock or Safety Nuts, of which the following is a specification.

This invention relates to improvements in nut locks, and particularly to the type wherein a longitudinal key is interposed between the nut and bolt.

The object of the invention is to produce a simple, cheap and effective device of this character.

The invention consists of a nut provided with a small bore adapted to receive a key having threads on part of its surface. The threads on the key, when turned to right or left, are adapted to bind in the threads of the bolt and secure the nut thereto.

The invention is illustrated in the drawings in which—

Figure 1 is a side elevation of a bolt and nut showing our invention, the nut being in section. Fig. 2 is a plan view of the nut showing the locking depressions. Fig. 3 is a section through the nut. Fig. 4 is a view of the locking member. Fig. 5 is a cross sectional view of the locking member showing the threads.

In the drawings 1 is a bolt, 2 a nut, 3 the thread on the bolt and 2' the threaded aperture in the nut. The nut 2 is provided with a bore 7 parallel to the threaded opening 2' and letting into said opening from the side and in the direction of its length, as at 10 in Fig. 2. Arranged within the bore 7 is a pin 4 having an angular projection or finger hold 5. The pin 4 is provided with straight threads 6, extending part way around its surface, said threads being deepest at their middle portions and becoming shallower toward their ends, the deepest parts of the threads allowing the threads of the bolt to register therewith. Upon turning the pin 4 to right or left brings the shallow parts against the bolt threads which bite thereinto when the nut is turned in the unscrewing direction. The face of the nut 2 is provided with three converging grooves 8, 9 and 9' meeting at one end of the bore 7. The finger-hold 5 is adapted to be seated in one or another of the grooves 9. The pin 4 is held from longitudinal displacement in the nut by an enlargement 11.

In operation, the pin in its inoperative position, that is, the projection 5 seated within the groove 8, and the threads 6 registering with the threads 3, the nut 2 is screwed home. The pin 4 is forced to one side or the other so that the projection 5 engages in either of the grooves 9 or 9'. This presents the small parts of the threads 6 to the threads 3 causing the latter to bite in them. Upon turning to unscrew the nut, the threads 3 will bite deeper into the threads 6, and bind the nut 2 securely in place.

It will be seen that a very efficient device is provided wherein the nut is prevented from unscrewing and the same caused to bind.

The grooves 8, 9 and 9' are very shallow so that the finger hold 5 while being securely held in its adjusted positions in the said grooves may be conveniently and effectively dislodged from either of the said grooves through the resiliency of the said finger hold.

Having thus described our invention, what is claimed as new is:—

1. The combination with a bolt having a threaded shank, of a nut engaged with the said shank and provided with a plurality of angularly disposed grooves, said nut having a bore formed at the point of intersection of the said grooves, said bore opening into the threaded aperture of the nut, a pin rotatably mounted in the bore and provided with a threaded portion adapted to engage the threaded portion of the bolt, and means carried by the said pin for engagement in the said grooves to hold the said pin in its adjusted position.

2. The combination with a threaded bolt, of a nut having a threaded passage to receive the bolt, said nut having a bore disposed in parallel relation to the passage formed in the nut and communicating therewith, said nut having a plurality of grooves radiating from the bore, a pin rotatably mounted in the bore, means for preventing longitudinal movement of the said pin, said pin having a portion thereof threaded to engage the threads of the bolt, and a finger hold carried by the pin adapted for locking engagement in the grooves to prevent rotation of the pin and to hold it in its adjusted position.

In testimony whereof we affix our signatures in presence of two witnesses.

JOHN T. CRAMER.
FRED S. LANGLEY.

Witnesses:
 JOHN REED,
 JOHN B. WHITCOMB.